May 22, 1951        E. E. BRAY        2,554,321

MEASUREMENT OF FLUORESCENCE

Filed Oct. 29, 1948

Ellis E. Bray
INVENTOR.

BY Frederick E. Dumoulin

ATTORNEY

Patented May 22, 1951

2,554,321

UNITED STATES PATENT OFFICE 2,554,321

MEASUREMENT OF FLUORESCENCE

Ellis E. Bray, Cedar Hill, Tex., assignor, by mesne assignments, to Socony-Vacuum Oil Company, Incorporated, New York, N. Y., a corporation of New York Application October 29, 1948, Serial No. 57,208

8 Claims. (Cl. 250—71)

This invention relates to fluorescence and relates more particularly to a method for measuring fluorescence.

Many materials fluoresce when subjected to radiation of the proper wave length, such as ultraviolet radiation, and this property of fluorescing has been utilized to make qualitative and quantitative tests of organic and inorganic materials, tests for purity, tests for technical identification, and other tests. In making these tests, the sample of material is placed in a beam of the desired exciting radiation and the intensity of the fluorescence measured by means of a suitable detector, such as a photo-electric cell. Other things being equal, the intensity of the fluorescence will be a function of the intensity of the exciting radiation and a function of the concentration of the fluorescing material in the sample. Accordingly, by employing exciting radiation of equal intensity on each sample, the intensity of the fluorescent light will be a measure of the concentration of the fluorescing material in the sample and comparison can be made between each sample and with reference samples. When measuring the fluorescence of materials which are not wholly transparent to the exciting radiation, and all materials are opaque to some degree, a portion, if not all, of the exciting radiation will be absorbed either by the fluorescing material per se or by other material in the sample. Consequently, the intensity of the exciting radiation will decrease progressively as it passes through the sample and the intensity of the fluorescent light from the sample will, as a result, likewise decrease. Therefore, the intensity of the fluorescence from each sample will be different as the samples differ in the extent to which they absorb the exciting radiation independent of the concentration of fluorescing material in each sample, and comparison of the intensity of the fluorescence between each sample, and with reference samples, as a measure of the amount of the fluorescent material contained therein will be in error.

It is an object of this invention to provide a process for making fluorescent measurements. It is another object of this invention to provide a process for making fluorescent measurements whereby the error due to absorption of exciting radiation is eliminated. It is another object of this invention to provide a process for measuring quantitatively amounts of fluorescing material. It is another object of this invention to provide a process for making direct comparison of intensity of fluorescence as a measure of amount of fluorescent material. Further objects of the invention will become apparent from the following description thereof.

In accordance with the invention, a sample of material for which analysis is to be made is placed in a beam of radiation which will excite fluorescence of the fluorescent material in the sample, and the intensity of the fluorescence and the intensity of the exciting radiation before and after absorption by the sample is measured. By this process, a correction factor obtained from the measured values of the intensity of the exciting radiation before and after absorption by the sample may be applied to the measured value of the intensity of the fluorescence, and the corrected value of the intensity of the fluorescence will be representative of the amount of fluorescing material without error due to absorption of exciting radiation. Direct comparison may then be made between samples and with reference samples irrespective of the absorption characteristics of each.

The invention will be more fully understood from the following detailed description taken in connection with the accompanying drawings in which.

Figure 1:
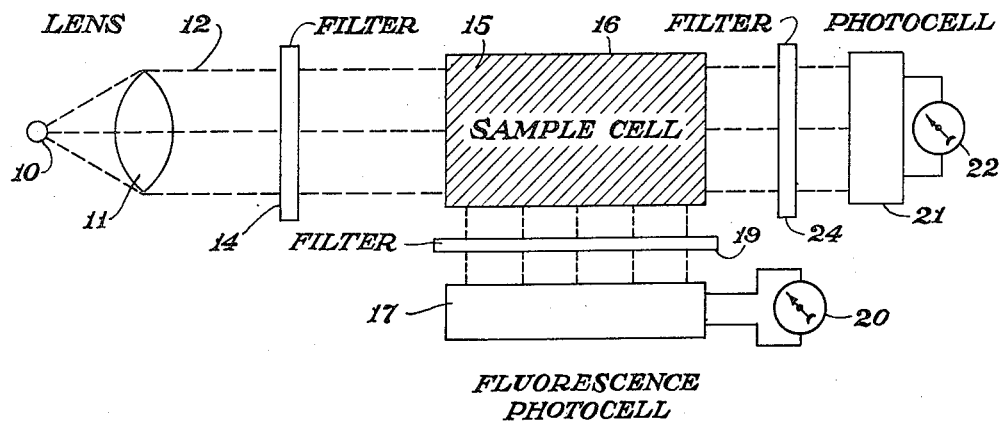
Figure 1 is a schematic diagram illustrating one method of carrying out the process of the invention.

Referring now to Figure 1, exciting radiation, such as ultraviolet light, from a suitable source 10 enters lens 11 to form a parallel beam of radiation 12. The beam passes through filter 14 which removes any undesired wave lengths and thence through sample 15 contained in sample cell 16. The sample fluoresces and the fluorescent light radiates in all directions. A photocell 17, sensitive to the fluorescence, is placed such that the fluorescent light from a fixed uniform area of the sample cell strikes the photocell. Ordinarily, the sample cell 16 will be rectangular or cylindrical in shape and the fluorescent light from a fixed uniform area will strike the photocell 17 by merely placing the photocell alongside the sample cell at a fixed distance. However, if desired, a plate (not shown) with a slit of suitable dimensions may be placed between the sample cell and the photocell for this purpose. A filter 19 is interposed between the sample cell and the photocell to remove any undesired wave lengths from the fluorescent light. The intensity of the fluorescent light may then be determined by measuring the value of the current produced by the photocell by current measuring instrument 20, which may be any suitable type of instrument such as a galvanometer, potentiometer, etc.

The fluorescent light striking the photocell 17 will be the summation of the fluorescent light from each point source of fluorescence in the sample exposed to the photocell. Stated otherwise, the photocell may be regarded as performing an integration of the fluorescence intensity since its response is the result of the integrated intensities of the sample exposed to the photocell. However, as stated previously, the intensity of fluorescence at any point is proportional to the intensity of the exciting light at that point, and therefore the light striking the photocell will be the summation of the light produced from each point in the sample exposed to the photocell, which light decreases in intensity along the length of the cell as the exciting light is absorbed. Thus, comparison of the current produced by the photocell for one sample cannot be made with the current produced by the photocell for another sample as a measure of the comparative amounts of fluorescing material in the samples where the extent of absorption of the exciting radiation is different.

The intensity of the fluorescent light, $I_f$, from the material at any point in the sample will be equal to the product of the intensity of the exciting radiation, $I$, and a proportionality constant, $n$. Therefore, (1) $$I_f = nI$$

Assuming that the exciting radiation obeys Beer's law, then (2) $$I = I_0 E^{-kl}$$

where $I_0$ is the intensity of the exciting radiation prior to entering the sample, $E$ is the base of the natural logarithms, $k$ is the absorption coefficient of the material for the exciting radiation, and $l$ is the distance the exciting radiation has traveled into the sample to reach the point of fluorescence. (Ordinarily, Beer's law is expressed as $I = I_0 E^{-kIC}$ where $C$ is the concentration of the absorbing material, but since $k$ and $C$ will be constant along the length of any one sample, $C$ may be combined with $k$.) The intensity of the fluorescence at any point in the sample will be a function of the concentration, $c$, of the fluorescing material at that point and therefore (3) $$I_f = f(c)$$

Combining Equations 1, 2, and 3 we have (4) $$I_f = f(c) n I_0 E^{-kl}$$

Integrating between the limits $l=0$ and $l=l_t$ (length of the sample cell), we have (5) $$F = f(c) N_1 I_0 \int_{l=0}^{l=l_t} E^{-Kl} dl = \frac{f(c) N_1 I_0}{K} [1 - E^{-Kl_t}]$$

where $F$ is the observed fluorescence and $N_1$ is a constant combining the proportionality constant $n$ and other factors constant over the length of the cell. Substituting the value of $E^{-Kl_t}$ from Beer's law, Equation 5 becomes (6) $$F = f(c) N_1 \frac{I_0 - I_t}{K}$$

where $I_t$ is the transmitted radiation. Rearranging (6) we have (7) $$\frac{f(c)}{N_1} = F\left(\frac{K}{I_0 - I_t}\right)$$

Since from (3), $f(c)$ is the fluorescence produced solely as a result of the concentration of the fluorescent material and remembering that $N_1$ is a constant related only to the fluorescent material and the sample cell, $$\frac{f(c)}{N_1}$$

will be the fluorescence, $F_c$, that would be obtained if there were no absorption of the exciting radiation by the sample. Accordingly, (8) $$F_c = F\left(\frac{K}{I_0 - I_t}\right)$$

This equation says that the corrected fluorescence, $F_c$, is the fluorescence observed, $F$, multiplied by a factor $$\frac{K}{I_0 - I_t}$$

which may be regarded as the correction factor.

The value of the correction factor, as a function of relative transmission of radiation, may be obtained as follows:

From Equation 2;

(9) $$\log \frac{I_0}{I_t} = Kl$$

where $I_0$ and $I_t$ are the intensities of the radiation entering and leaving a sample cell of length $l$. If a sample cell of the same length is used each time, $l$ will be constant and (9) will become

(10) $$\log \frac{I_0}{I_t} = K$$

Giving $I_0$ an arbitrarily selected value, as 100, $I_t$ will have a value which will be a proportionate part of the value $I_0$. Thus, if $I_t$ is only one-half the value of $I_0$, $I_0$ may be regarded as 100 and $I_t$ as 50. A value for $K$ may then be obtained from Equation 9 and the value may be substituted in the correction factor, $$\frac{K}{I_0 - I_t}$$

However, since both the numerator and denominator of the correction factor will be zero when $I_0 = I_t$, i. e., when there is no absorption, the correction factor, which should be unity under these conditions, will be indeterminate. The correction factor accordingly must be adjusted to give a definite value under all conditions. This may be done by assuming that no correction is necessary when $I_t$ is equal to or greater than some arbitrarily selected proportion of $I_0$, for example 99.9%, i. e., the correction factor will be unity when $I_t$ is 99.9 and $I_0$ is set at 100. Thus, by setting $$\frac{K_2}{I_{100} - I_{99.9}}$$

equal to unity, the correction factor may then be expressed as

(11) $$\frac{K_1}{I_0 - I_t} \bigg/ \frac{K_2}{I_{100} - I_{99.9}}$$

and Equation 8 becomes

(12) $$F_c = F\left(\frac{K_1}{I_0 - I_t} \Big/ \frac{K_2}{I_{100} - I_{99.9}}\right)$$

Since Equation 11 is not dependent upon any factor relating to the sample cell or the type of exciting radiation employed, these factors cancelling out, the correction factor, as a function of the extent of transmission of the exciting radiation, may be computed for all cases. The correction factor is plotted as a function of the percent transmission in Figure 2.

The intensity of the exciting radiation transmitted through the sample, i. e., the exciting radiation after absorption by the sample, is measured by passing the beam of radiation 12 through the sample cell containing the sample and upon photocell 21. The current produced by the photocell is measured by current measuring instrument 22 which may be similar to instrument 20. In order to prevent the fluorescent light from the sample striking photocell 21 and thereby contributing current from the photocell additional to that produced by the transmitted radiation, a suitable filter 24 to remove the fluorescent light is placed between sample cell 16 and photocell 21. Where the sample absorbs all of the exciting radiation and there is no transmitted radiation whose intensity can be measured, the distance through which the exciting radiation passes through the sample may be progressively shortened, by employing sample cells of progressively shorter length, until a measurable quantity of radiation is transmitted through the sample.

The intensity of the exciting radiation is measured by passing the beam 12 upon the photocell 21. The current from the photocell is similarly measured by current measuring instrument 22. Since the material of which the sample cell is composed may absorb some of the exciting radiation, in order to compensate for the radiation absorbed by the sample cell during measurement of the intensity of the transmitted radiation, the measurement of the intensity of the exciting radiation should be made with the sample cell in place in the beam 12. For the same reason, where the sample of material whose fluorescence is to be measured is in admixture with a carrying material, as for example, in solution in a solvent used for preparation of the sample, for convenience in handling, or otherwise, the measurement of the intensity of the exciting radiation should be made with the solvent or other carrying material in the beam 12. In this connection, it is necessary that the beam pass through the same length of solvent or other carrying material as through the sample for measurement of the transmitted radiation. This may be done by employing sample cells of the same length for both measurements.

Figure 2:
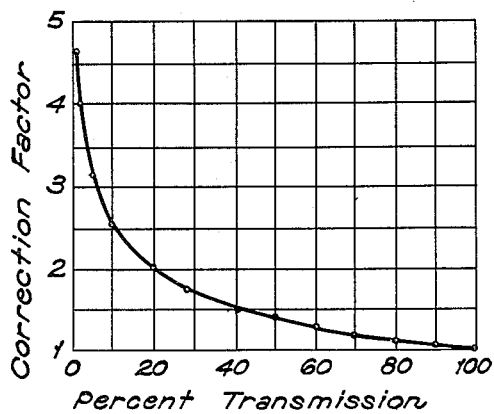
Figure 2 is a graph showing the correction factor as a function of the proportion, expressed as percent, of the amount of exciting radiation after absorption by the sample to the amount of exciting radiation before absorption by the sample.

From the ratio of the intensity of the transmitted radiation to the exciting radiation, the correction factor may be determined from Equation 10 and Expression 11 or from the graph of Figure 2, and the corrected fluorescence from Equation 12.

The intensity of the fluorescence may be measured in any desired units. The intensity of the exciting radiation may also be measured in any desired units and the intensity of the transmitted radiation measured in these same units. The ratio of intensities, converted to per cent of the exciting radiation transmitted, may be calculated and the value of the correction factor determined from Figure 2. The corrected fluorescence may then be calculated by multiplying the value of the observed fluorescence by this correction factor. The correction factor may also be calculated by substituting the measured values of $I_0$ and $I_t$ in Equation 10 to obtain the value of $K$ which is $K_1$ in Equation 12, obtaining the value of $K_2$ in similar manner using the value of $I_0$ for $I_{100}$ and 99.9 per cent of the value of $I_t$ for $I_{99.9}$, and substituting the same values for the K's and I's in Equation 11. The corrected fluorescence will be obtained from Equation 12. Alternately, the values of $I_0$ and $I_t$ as measured may be converted to the basis that $I_0$ is 100, the values of $K_1$ and $K_2$ obtained therefrom, and these values of the K's and I's substituted in Equation 12.

While the invention has been described in connection with measurement of the fluorescence at right angles to the exciting radiation, it will be understood that measurement of the fluorescence may be made otherwise, as by placing the photocell in a position to make what is known in the art as backward or forward observation of the fluorescence.

The method of the invention is applicable to the measurement of fluorescence of any material which fluoresces and which transmits at least a fraction of the exciting radiation. The material may be a solid or a liquid and the measurement may be made on the material alone or in admixture with either other solids or other liquids. The invention is particularly applicable to the measurement of the fluorescence of soil extracts for determination of their hydrocarbon content as diagnostic of the presence of oil reservoirs. Soil extracts will vary considerably in ability to absorb exciting radiation, giving rise to wide variations in the intensity of the observed fluorescence despite similarity in concentration of hydrocarbons. Further, the hydrocarbons themselves may absorb exciting radiation to an extent that wide variations in concentration of hydrocarbons may be masked. By the process of the invention, variations in fluorescence due to absorption of the exciting radiation are eliminated and the fluorescence intensity provides a sensitive and accurate indication of the hydrocarbon concentration.

Figure 3:
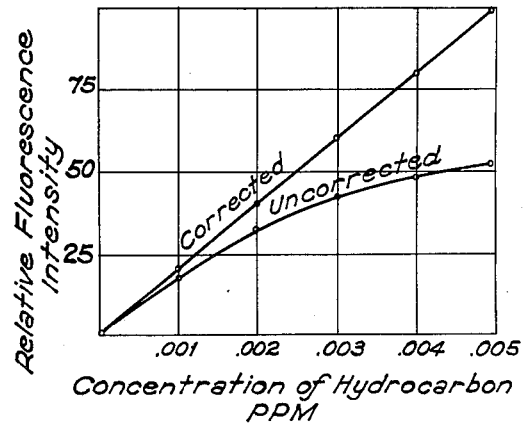
Figure 3 is a graph showing corrected and uncorrected values of fluorescence intensity of soil extracts.

Figure 3 illustrates the difference in the values of the corrected and uncorrected intensities of fluorescence for extracts of surface soil samples prepared by extracting the samples with a solvent composed of equal parts of methanol and carbon tetrachloride. The fluorescence was determined by illuminating a sample of the extract in a sample cell with ultraviolet radiation and measuring the current produced from a photocell placed alongside the sample cell. The ultraviolet radiation passing through the sample cell was determined by measuring the current produced from a photocell placed at the end of the sample cell to give the value of the intensity of the transmitted radiation. The value of the intensity of the exciting ultraviolet radiation was then determined by replacing the sample cell with a similar cell filled with equal parts of methanol and carbon tetrachloride. The measured value of the intensity of the fluorescence was then corrected in accordance with the ratio of the exciting radiation to the transmitted radiation using the chart of Figure 2. The values of the corrected and uncorrected intensities of fluorescence are plotted in Figure 3. The abscissa is the concentration of hydrocarbons expressed in parts per million of soil and the ordinate is the relative intensity of fluorescence based on an arbitrary scale between 0 and 100.

Having thus described my invention, it will be understood that such description has been given by way of illustration and example only and not by way of limitation, reference for the latter purpose being had to the appended claims.

I claim:

1. In a process for quantitatively analyzing by measurement of fluorescence a material which fluoresces under the influence of exciting radiation and which absorbs at least a portion of the exciting radiation, the steps which comprise placing said material in the path of a beam of exciting radiation, measuring the intensity of the fluorescence of said material, measuring the intensity of said beam of exciting radiation prior to and subsequent to absorption by said material, and correcting the value of the measured intensity of the fluorescence of said material to the extent that the exciting radiation is absorbed by said material by increasing said value the number of times given by the expression $$\frac{K}{I_0 - I_t}$$

where $I_0$ is the intensity of the beam of exciting radiation prior to absorption by said material, $I_t$ is the intensity of the beam of exciting radiation subsequent to absorption by said material, and K is the logarithm of the ratio of $I_0$ to $I_t$.

2. In a process of quantitatively analyzing by measurement of fluorescence a material which fluoresces under the influence of exciting radiation and which absorbs at least a portion of the exciting radiation, the steps which comprise placing said material in the path of a beam of exciting radiation of known intensity, measuring the intensity of the fluorescence of said material, measuring the intensity of the beam of exciting radiation after transmission through said material, and correcting the value of the measured intensity of the fluorescence of said material to the extent that the exciting radiation is absorbed by said material by increasing said value the number of times given by the expression $$\frac{K}{I_0 - I_t}$$

where $I_0$ is the intensity of the beam of exciting radiation before transmission through said material, $I_t$ is the intensity of the beam of exciting radiation after transmission through said material, and K is the logarithm of the ratio of $I_0$ to $I_t$.

3. In a process for quantitatively analyzing by measurement of fluorescence a material which fluoresces under the influence of exiciting radiation and which absorbs at least a portion of the exciting radiation, said material being in admixture with a carrying material, the steps which comprise placing said material in the path of a beam of exciting radiation, measuring the intensity of the fluorescence produced, measuring the intensity of said beam of exciting radiation after transmission through a fixed distance of said carrying material free of said material, measuring the intensity of said beam of exciting radiation after transmission through the same fixed distance of said material in admixture with said carrying material, and correcting the value of the measured intensity of the fluorescence to the extent that the exciting radiation is absorbed by increasing said value the number of times given by the expression $$\frac{K}{I_0 - I_t}$$

where $I_0$ is the intensity of the beam of exciting radiation after transmission through the fixed distance of said carrying material free of said material, $I_t$ is the intensity of the beam of exciting radiation after transmission through the same fixed distance of said material in admixture with said carrying material, and K is the logarithm of the ratio of $I_0$ to $I_t$.

4. In a process for quantitatively analyzing by measurement of fluorescence a material which fluoresces under the influence of exciting radiation and which absorbs at least a portion of the exciting radiation, said material being in admixture with a carrying material, the steps which comprise passing a beam of exciting radiation for a fixed distance through a portion of said carrying material free of said material, measuring the intensity of the beam of exciting radiation after transmission through said fixed distance of said carrying material, passing said beam of exciting radiation for the same fixed distance through a portion of said material in admixture with said carrying material, measuring the intensity of the fluorescence of said material in admixture with said carrying material, measuring the intensity of the beam of exciting radiation after transmission through said material in admixture with said carrying material, and correcting the value of the measured intensity of the fluorescence to the extent that the exciting radiation is absorbed by increasing said value the number of times given by the expression $$\frac{K}{I_0 - I_t}$$

where $I_0$ is the intensity of the beam of exciting radiation after transmission through said fixed distance of said carrying material, $I_t$ is the intensity of the beam of exciting radiation after transmission through said fixed distance of said material in admixture with said carrying material, and K is the logarithm of the ratio of $I_0$ to $I_t$.

5. In a process for quantitatively analyzing by measurement of fluorescence a solution containing a solvent and containing a component which fluoresces under the influence of exciting radiation and which solution absorbs at least a portion of the exciting radiation, the steps which comprise placing said solution in the path of a beam of exciting radiation, measuring the intensity of the fluorescence of said solution, measuring the intensity of said beam of exciting radiation after transmission through a fixed distance of said solution, measuring the intensity of said beam of exciting radiation after transmission through the same fixed distance of said solvent free of said component, and correcting the value of the measured intensity of the fluorescence of said solution to the extent that the exciting radiation is absorbed by increasing said value the number of times given by the expression $$\frac{K}{I_0 - I_t}$$

where $I_0$ is the intensity of the beam of exciting radiation after transmission through the fixed distance of said solvent free of said component, $I_t$ is the intensity of the beam of exciting radiation after transmission through said fixed distance of said solution, and K is the logarithm of the ratio of $I_0$ to $I_t$.

6. In a process for quantitatively analyzing by measurement of fluorescence a solution containing a solvent and containing a component capable of fluorescing under the influence of exciting radiation and which solution absorbs at least a portion of the exciting radiation, the steps which comprise passing a beam of exciting radiation for a fixed distance through a portion of said solvent, measuring the intensity of the beam of exciting radiation after transmission through said fixed distance of said solvent, passing said beam of exciting radiation for the same fixed distance through said solution, measuring the intensity of the fluorescence of said solution, measuring the intensity of the beam of exciting radiation after transmission through said solution, and correcting the value of the measured intensity of the fluorescence of said solution to the extent that the exciting radiation is absorbed by increasing said value the number of times given by the expression $$\frac{K}{I_0 - I_t}$$

where $I_0$ is the intensity of the beam of exciting radiation after transmission through said fixed distance of said solvent, $I_t$ is the intensity of the beam of exciting radiation after transmission through said fixed distance of said solution, and $K$ is the logarithm of the ratio of $I_0$ to $I_t$.

7. In a process for quantitatively analyzing by measurement of fluorescence a material which fluoresces under the influence of exciting radiation and which absorbs at least a portion of the exciting radiation, the steps which comprise transmitting exciting radiation through said material, measuring the intensity of said exciting radiation in the absence of absorpton of said exciting radiation by said material, measuring the intensity of the fluorescence of said material produced by said exciting radiation, measuring the intensity of said exciting radiation after transmission through said material, and correcting the value of the measured intensity of the fluorescence of said material to the extent that the exciting radiation is absorbed by increasing said value the number of times given by the expression $$\frac{K}{I_0 - I_t}$$

where $I_0$ is the intensity of the beam of exciting radiation in the absence of absorption by said material, $I_t$ is the intensity of the beam of exciting radiation after transmission through said material, and $K$ is the logarithm of the ratio of $I_0$ to $I_t$.

8. In a process for quantitatively analyzing by measurement of fluorescence a material which fluoresces under the influence of exciting radiation and which absorbs at least a portion of the exciting radiation, the steps which comprise transmitting exciting radiation through said material, measuring the intensity of said exciting radiation in the absence of absorption of said exciting radiation by said material, measuring the intensity of the fluorescence of said material produced by said exciting radiation, filtering the exciting radiation transmitted through said material to remove fluorescent light therefrom, measuring the intensity of said filtered exciting radiation, and correcting the value of the measured intensity of the fluorescence of said material to the extent that the exciting radiation is absorbed by said material by increasing said value the number of times given by the expression $$\frac{K}{I_0 - I_t}$$

where $I_0$ is the intensity of the beam of exciting radiation in the absence of absorption by said material, $I_t$ is the intensity of the filtered exciting radiation transmitted from said material, and $K$ is the logarithm of the ratio of $I_0$ to $I_t$.

ELLIS E. BRAY.

REFERENCES CITED

The following references are of record in the file of this patent:

UNITED STATES PATENTS

| Number | Name | Date |
|---|---|---|
| 2,051,320 | States | Aug. 18, 1936 |
| 2,265,357 | Demarest | Dec. 9, 1941 |
| 2,286,985 | Hanson | June 16, 1942 |
| 2,403,631 | Brown | July 9, 1946 |
| 2,459,512 | Fash et al. | Jan. 18, 1949 |

OTHER REFERENCES

Luminescence, by P. Pringsheim, Interscience Publishers Inc., N. Y., 1943, pp. 55–58.